(No Model.)

C. W. MASSENHEIMER.
HAME CLIP.

No. 297,277. Patented Apr. 22, 1884.

WITNESSES:
Johner G. Deemer
C. Sedgwick

INVENTOR:
C. W. Massenheimer
BY Munn & Co.
ATTORNEYS.

UNITED STATES PATENT OFFICE.

CHARLES W. MASSENHEIMER, OF ALLENTOWN, PENNSYLVANIA.

HAME-CLIP.

SPECIFICATION forming part of Letters Patent No. 297,277, dated April 22, 1884.

Application filed February 25, 1884. (No model.)

*To all whom it may concern:*

Be it known that I, CHARLES W. MASSENHEIMER, of Allentown, in the county of Lehigh and State of Pennsylvania, have invented a new and Improved Hame-Clip, of which the following is a full, clear, and exact description.

The object of this invention is to provide an improved hame-clip for attaching the hame-tugs or the traces of harness to the hames thereof, whereby the hame-tugs or the traces may be easily attached to and detached from the hames without ripping the tug or trace or breaking the hame eye or staple; and the invention consists, principally, in making the clip with a hook and hinged tongue or section, the hook being made integral with the side plates of the clip, the side plates being joined with a solid shoulder or bridge at their forward ends.

The invention also consists in providing the hinged section with a catch adapted to engage with a notched stud for closing the clip; and the invention also consists of the construction, arrangement, and combination of parts, all as hereinafter described and claimed.

Reference is to be had to the accompanying drawings, forming part of this specification, in which similar letters of reference indicate corresponding parts in both the figures.

Figure 1:
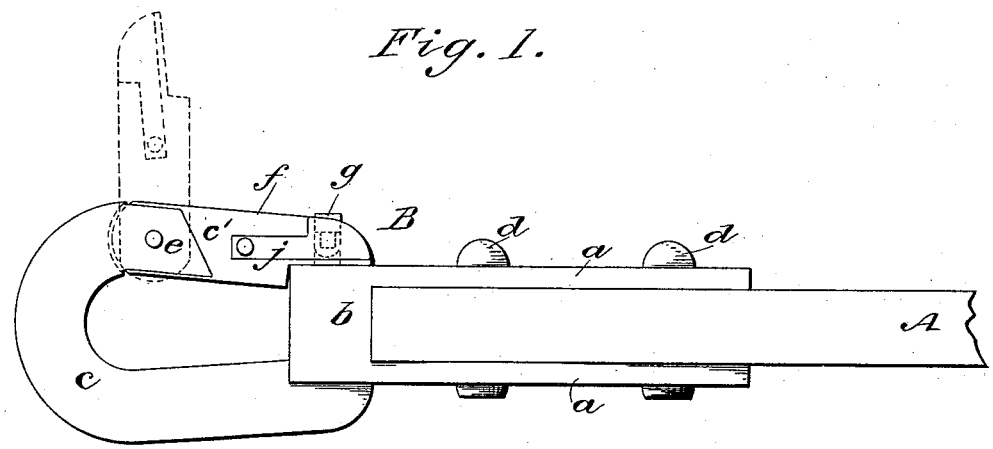
Figure 2:
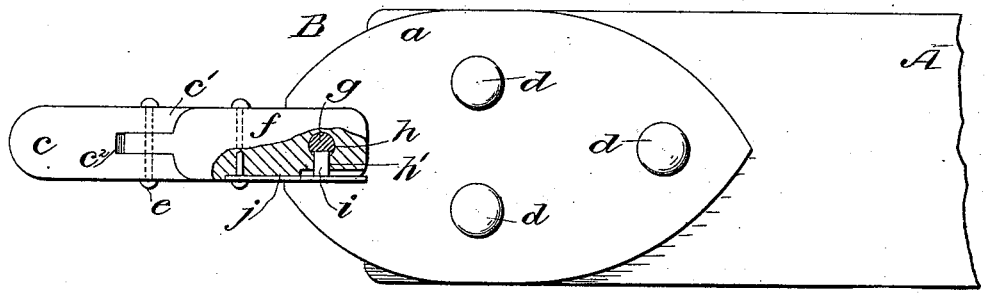

Figure 1 is a plan of my new and improved hame-clip, showing in dotted lines the hinged closing section or tongue in opened position; and Fig. 2 is a broken side elevation of the clip, showing the hinged section locked in closed position.

A represents the forward end of a hame tug or trace of a harness, and B represents my new and improved hame-clip, which is secured to the tug or trace A by the rivets $d$-$d$ passing through the side plates, $a$ $a$, of the clip B, and through the hame tug or trace A, as shown. The side plates, $a$, of the clip B are made integral with each other, being joined by the solid shoulder or bridge $b$, and they are made integral also with the hook $c$, which is joined at the bridge $b$, thus making the main portion of the clip very firm and solid, and at the same time cheap to manufacture, since this main portion, side plate, bridge, and hook may be cast solid in one piece. The end of the hook $c$ is beveled off, as shown at $c'$, and is slotted, as shown at $c^2$, and in this slot $c^2$ is hinged upon the pin $e$ the closing tongue or section $f$, which, when closed to the position shown in full lines in Fig. 1, closes the entrance to the hook $c$, but, when swung outward to the position shown in dotted lines, opens the entrance to said hook, so that the clip may be easily attached to or detached from the eye or staple of the hame of the harness. For locking the hinged tongue or section $f$ in closed position, I form or provide the outer surface of the bridge $b$ with the notched pin or stud $g$, which is adapted to pass through the passage $h$, made in the tongue or section $f$, and to be engaged by the inner end of the pin $i$, attached to the spring-plate $j$, said pin $i$ entering the side passage, $h'$, made in section $f$ at right angles to the passage $h$, as will be understood from Fig. 1. By pressing the outer free end of the spring-plate $j$ outward, the pin $i$ will be disengaged from the stud or pin $h$, leaving the section or tongue $f$ free to be swung outward for opening the hook $c$. The upper end of the stud $g$ will be beveled slightly, so that by simply closing the section $f$ and pressing slightly upon its outer surface it will become securely locked in closed position.

Constructed in the manner described, it will be seen that the clip is very cheap, practical, and strong, and that it is very convenient, since the hames may be easily detached from and attached to the harness when it is expedient to do so.

Having thus described my invention, what I claim as new, and desire to secure by Letters Patent, is—

1. The hame-clip herein shown and described, formed of the plates $a$, bridge $b$, and hook $c$, made in one piece, and the hinged closing-tongue $f$, arranged for closing the entrance to the hook $c$, substantially as described.

2. In a hame-clip, the closing-section $f$, hinged to the end of the hook $c$, and provided with the catch-hook and spring $j$ $i$, in combination with notched pin or stud $g$, formed upon one side of the clip, substantially as and for the purposes set forth.

CHARLES W. MASSENHEIMER.

Witnesses:
ORLANDO KEEN,
CHARLES A. KLOTZ.